(12) United States Patent
Sakuragi

(10) Patent No.: US 11,706,354 B2
(45) Date of Patent: Jul. 18, 2023

(54) INFORMATION PROCESSING DEVICE, MANAGEMENT PROGRAM AND MANAGEMENT METHOD FOR MANAGING STORAGE DEVICES

(71) Applicant: BROTHER KOGYO KABUSHIKI KAISHA, Nagoya (JP)

(72) Inventor: Yuichiro Sakuragi, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/586,792

(22) Filed: Jan. 28, 2022

(65) Prior Publication Data
US 2022/0247876 A1    Aug. 4, 2022

(30) Foreign Application Priority Data
Jan. 29, 2021  (JP) .................. 2021-013363

(51) Int. Cl.
*H04N 1/00*    (2006.01)

(52) U.S. Cl.
CPC ....... *H04N 1/00344* (2013.01); *H04N 1/0009* (2013.01); *H04N 1/00408* (2013.01)

(58) Field of Classification Search
None
See application file for complete search history.

(56) References Cited

U.S. PATENT DOCUMENTS

2014/0100872 A1* 4/2014 Venugopal ............. G16H 10/60
705/3

FOREIGN PATENT DOCUMENTS

JP    H11-296457 A    10/1999

* cited by examiner

*Primary Examiner* — Lennin R Rodriguezgonzalez
(74) *Attorney, Agent, or Firm* — Kenealy Vaidya LLP

(57) ABSTRACT

An information processing device for a management system in which a management device and the information processing device are configured to communicate with a storage device. The information processing device comprising a controller that is configured to download, from the storage device, an instruction template including a plurality of pieces of processing instruction information for instructing a plurality of pieces of processing to be executed by the information processing device, create an update template in which each of the plurality of pieces of processing instruction information in the instruction template is replaced with a corresponding piece of a plurality of pieces of processing notification information to be notified to the management device and upload the update template to the storage device.

9 Claims, 13 Drawing Sheets

FIG. 5

| PartitionKey | RowKey | DeviceId | NotifyParameter | Progress | Source |
|---|---|---|---|---|---|
| registration | %CUSTOM(DEVICEID)% | %CUSTOM(DEVICEID)% | { "x.x.x.x.x.x.x.x.x.x": "%MIB(x.x.x.x.x.x.x.x.x.x)%", "y.y.y.y.y.y.y.y.y.y": "%MIB(y.y.y.y.y.y.y.y.y.y)%", "z.z.z.z.z.z.z.z.z.z": "%MIB(z.z.z.z.z.z.z.z.z.z)%", .... } | %CUSTOM(PROGRESS)% | %CUSTOM(SOURCE)% |

D1

| PartitionKey | RowKey | DeviceId | NotifyParameter | Progress | Source |
|---|---|---|---|---|---|
| registration | %CUSTOM(DEVICEID)% | AAAAAAAA | { "x.x.x.x.x.x.x.x.x.x": "12345678910123", "y.y.y.y.y.y.y.y.y.y": "0", "z.z.z.z.z.z.z.z.z.z": "", .... } | request | device |

| PartitionKey | RowKey | DeviceId | NotifyParameter | Progress | Source |
|---|---|---|---|---|---|
| status | %CUSTOM(DEVICEID)% | %CUSTOM(DEVICEID)% | | %CUSTOM(PROGRESS)% | %CUSTOM(SOURCE)% |

```
{
"x.x.x.x.x.x.x.x.x.x.x.x": "%MIB(x.x.x.x.x.x.x.x.x.x.x.x)%",
"y.y.y.y.y.y.y.y.y.y.y.y": "%MIB(y.y.y.y.y.y.y.y.y.y.y.y)%",
"z.z.z.z.z.z.z.z.z.z.z.z": "%MIB(z.z.z.z.z.z.z.z.z.z.z.z)%",
.....
```

D4:

| PartitionKey | RowKey | DeviceId | NotifyParameter | Progress | Source |
|---|---|---|---|---|---|
| status | %CUSTOM(DEVICEID)% | AAAAAAAA | | %CUSTOM(done)% | device |

```
{
"x.x.x.x.x.x.x.x.x.x.x.x": "9876543210987....",
"y.y.y.y.y.y.y.y.y.y.y.y": "40000",
"z.z.z.z.z.z.z.z.z.z.z.z": "Sleep",
.....
```

FIG. 10

| PartitionKey | RowKey | DeviceId | NotifyParameter | Progress | Source |
|---|---|---|---|---|---|
| instanttask | Transaction id | Device id | json(Setting) | %CUSTOM(request)% | |

D11

| PartitionKey | RowKey | DeviceId | NotifyParameter | Progress | Source |
|---|---|---|---|---|---|
| instanttask | Transaction id | Device id | json(Setting) | %CUSTOM(processing)% | |

D12

| PartitionKey | RowKey | DeviceId | NotifyParameter | Progress | Source |
|---|---|---|---|---|---|
| instanttask | Transaction id | Device id | json(Setting) | %CUSTOM(done)% or %CUSTOM(error)% | |

D13

INFORMATION PROCESSING DEVICE, MANAGEMENT PROGRAM AND MANAGEMENT METHOD FOR MANAGING STORAGE DEVICES

CROSS REFERENCE TO RELATED APPLICATIONS

This application is based on Japanese Patent Applications No. 2021-013363 filed on Jan. 29, 2021, the entire contents of which are incorporated herein by reference.

TECHNICAL FIELD

The present disclosure relates to a technology for managing a terminal device.

BACKGROUND ART

JP-A-H11-296457 discloses that a management device connected to a terminal device such as an image forming device sequentially acquires management data from the terminal device by data communication according to an SNMP protocol to manage the terminal device.

The data communication according to the SNMP protocol requires the management device to sequentially acquire the management data from the terminal device. Therefore, in order for the management device to acquire a large number of pieces of management data from the terminal device, it is necessary to perform a large amount of communication according to the number of pieces of management data.

An object of the present disclosure is to improve an efficiency of data acquisition by a management device in a management system that manages a terminal device.

SUMMARY OF INVENTION

According to an aspect of the present disclosure, an information processing device for a management system in which a management device and the information processing device are configured to communicate with a storage device includes a controller. The controller is configured to execute download processing, creation processing and upload processing.

In the download processing, an instruction template including a plurality of pieces of processing instruction information for respectively instructing a plurality of pieces of processing to be executed by the information processing device is downloaded from the storage device. In the creation processing, an update template in which each of the plurality of pieces of processing instruction information in the instruction template is replaced with a corresponding piece of a plurality of pieces of processing notification information to be notified to the management device is created.

In the upload processing, the update template created by the creation processing is uploaded to the storage device. The information processing device according to the present disclosure configured as described above may cause the management device to collectively acquire the plurality of pieces of processing notification information by causing the management device to download the update template, and thus, the management device may efficiently acquire data.

According to another aspect of the present disclosure, a management program is configured to cause a controller included in an information processing device for a management system in which a management device and the information processing device are configured to communicate with a storage device, to execute download processing, creation processing and upload processing.

A computer controlled by the management program according to the present disclosure may constitute a part of the information processing device according to the present disclosure, and may obtain effects the same as those of the information processing device according to the present disclosure. Still another aspect of the present disclosure provides a management method executed by an information processing device for a management system in which a management device and the information processing device are configured to communicate with a storage device. The management method includes a download step, a creation step and an upload step.

The management method according to the present disclosure is a method executed by the information processing device according to the present disclosure, and effects the same as those of the information processing device according to the present disclosure can be obtained by executing the method.

BRIEF DESCRIPTION OF DRAWINGS

FIG. 5 is a diagram showing registration data and registered data.

FIG. 7 is a diagram showing status task instruction data and status task execution result data.

FIG. 10 is a diagram showing task instruction data, task execution data and execution result data in an instant task.

DESCRIPTION OF EMBODIMENTS

Figure 1:
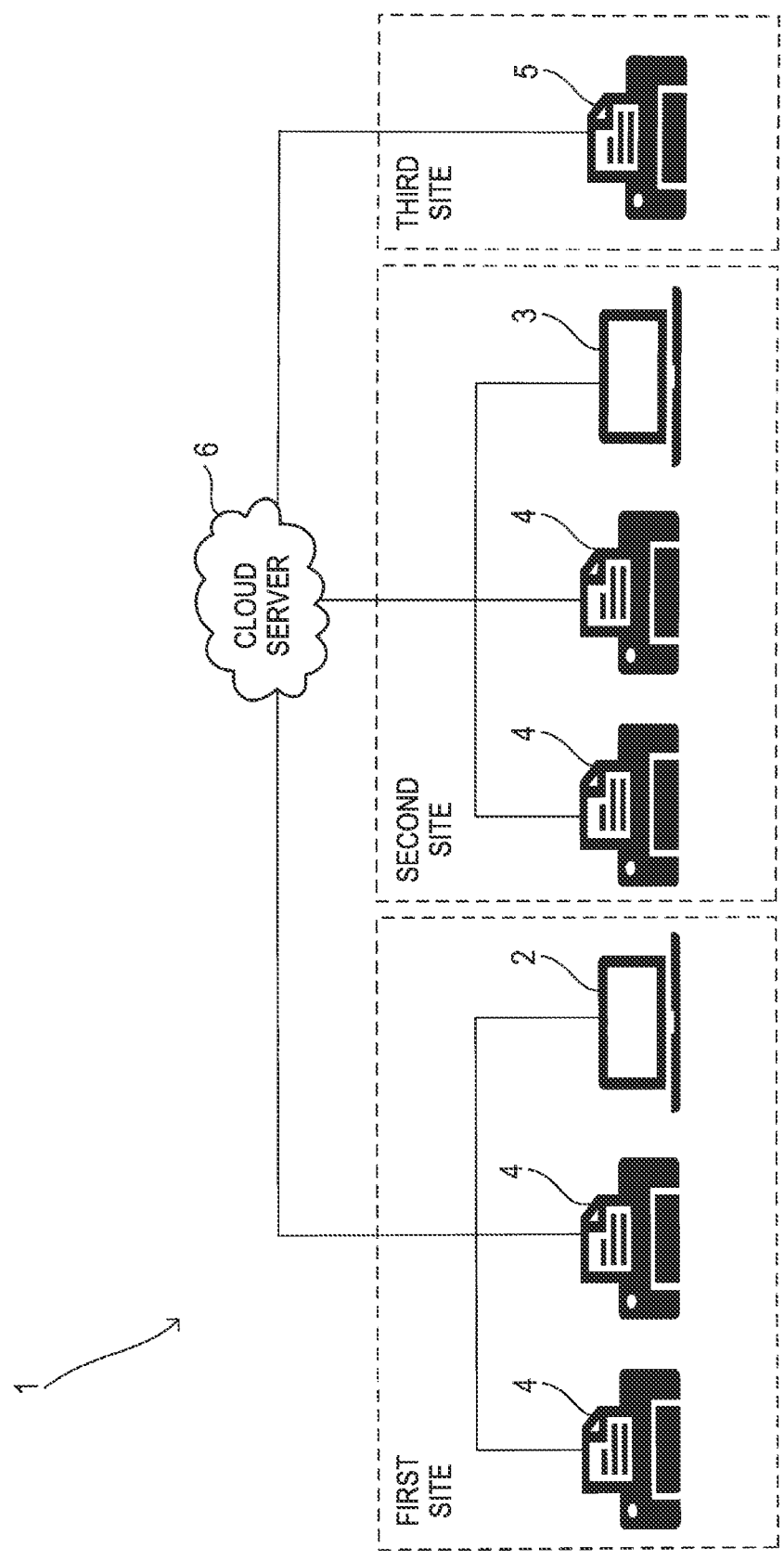
FIG. 1 is a block diagram showing a configuration of a management system.

Hereinafter, an exemplary embodiment of the present disclosure will be described with reference to the drawings.

(1) Overall Configuration

A management system 1 according to the exemplary embodiment of the present disclosure is a network system configured to manage terminal devices 4, 5 arranged at a plurality of sites via a cloud server 6 by cooperation of a master 2 and a client 3.

The master 2 shown in FIG. 1 is configured to be able to communicate with the terminal device 4 installed at a first site via a local area network. The master 2 is further configured to be able to communicate with the cloud server 6 via a wide area network.

The client 3 is configured to be able to communicate with the terminal device 4 installed at a second site via a local area network. The client 3 is further configured to be able to communicate with the cloud server 6 via a wide area network. The terminal device 5 installed at a third site is configured to be able to communicate with the cloud server 6 via a wide area network.

The local area network may include, for example, at least one of a wireless LAN and a wired LAN. The wide area network may include, for example, the Internet. A local area network may be constructed in the third site. In this case, the terminal device 5 may be connected to the wide area network via the local area network in the third site.

The terminal device 4 does not have a capability of using a cloud service provided by the cloud server 6. In other words, each terminal device 4 does not have a function of communicating with the cloud server 6. Hereinafter, the terminal device 4 is particularly referred to as a first-type terminal device 4. On the other hand, the terminal device 5 is a terminal device that can use the cloud service provided by the cloud server 6. In other words, the terminal device 5 has a function of communicating with the cloud server 6. Hereinafter, the terminal device 5 is particularly referred to as a second-type terminal device 5.

The first-type terminal device 4 installed in the second site is managed by the master 2 via the client 3 and the cloud server 6. The second-type terminal device 5 installed in the third site is managed by the master 2 via the cloud server 6 without via the client 3.

The terminal devices 4, 5 managed by the master 2 may be, for example, a group of terminal devices managed by an organization such as a company. In this case, each site may be an activity site of the organization. For example, the first site where the master 2 is present may be an office of an organization management department. The other second and third sites may be branch offices of the organization, which are separated from the first site.

Examples of the terminal devices 4, 5 include a printer, a scanner, and a digital multifunction peripheral in which these functions are integrated. The master 2 and the client 3 are configured by installing a dedicated computer program in a personal computer, for example.

(2) Device Configuration

Figure 2:
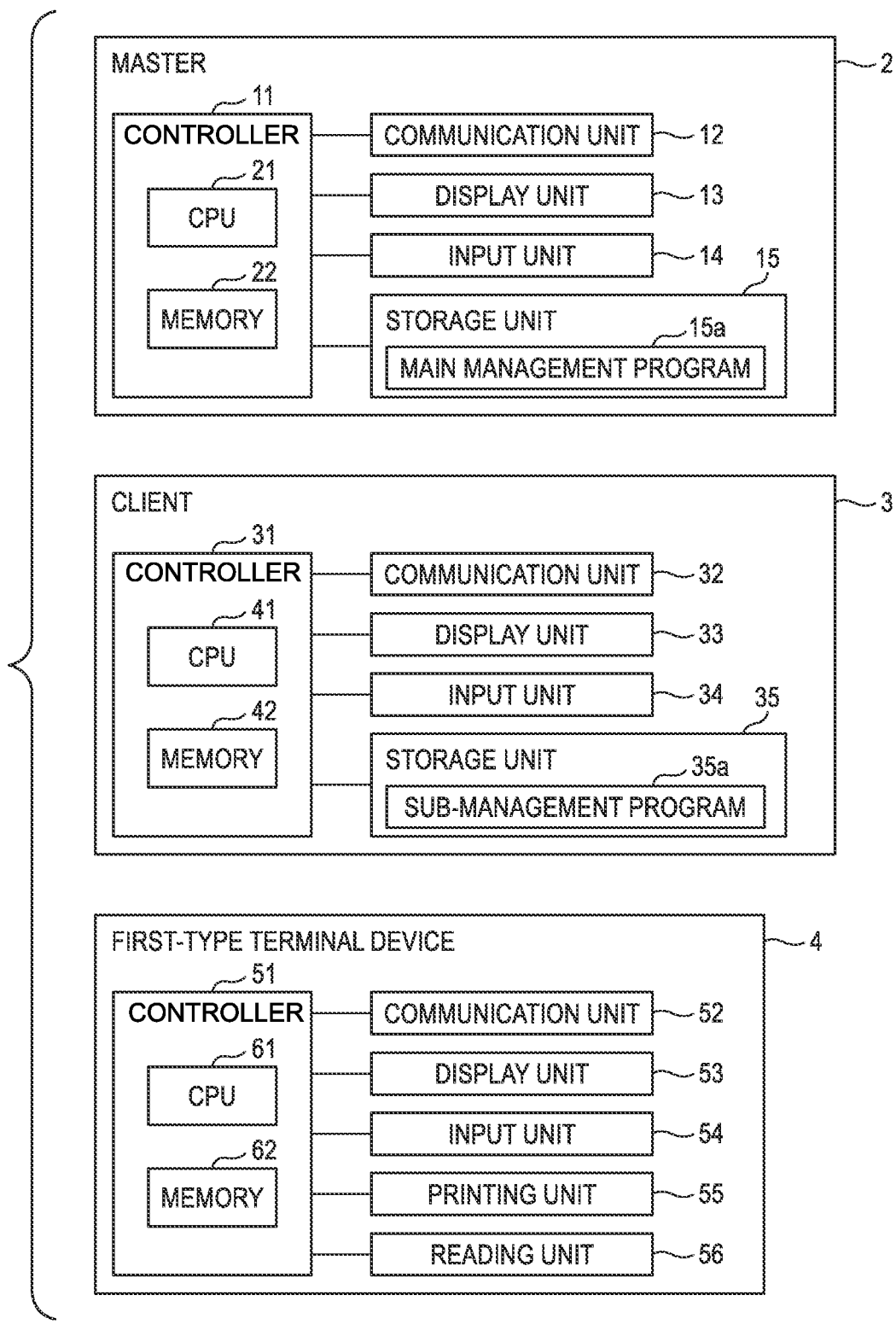
FIG. 2 is block diagrams showing configurations of a master, a client and a first-type terminal device.

As shown in FIG. 2, the master 2 includes a controller 11, a communication unit 12, a display unit 13, an input unit 14 and a storage unit 15. The controller 11 includes a CPU 21 and a memory 22. The CPU 21 serving as a processor executes processing according to a computer program stored in the storage unit 15. The memory 22 is used as a work memory when the above processing is executed.

The storage unit 15 includes, for example, a storage such as a solid state drive and a hard disk drive, and stores various computer programs and data. The storage unit 15 stores a main management program 15*a*. The main management program 15*a* is a computer program for causing the CPU 21 to implement a management function to be implemented by the master 2. It may be understood that processing mainly executed by the controller 11 described below is implemented by the processing executed by the CPU 21 according to the computer program.

The communication unit 12 is connected to the local area network in the site where the master 2 is present, and is further connected to the wide area network. The communication unit 12 may be connected to the wide area network via a router (not shown). The display unit 13 is configured to display various screens for a user who operates the master 2. An example of the display unit 13 includes a liquid crystal display. Examples of the various screens include a screen that displays log information and status information of the terminal devices 4, 5 to be managed, and a screen for remotely operating the terminal devices 4, 5 according to an operation signal from the user.

The input unit 14 includes one or more input devices for inputting the operation signal from the user who operates the master 2, such as a keyboard and a pointing device. The controller 11 operates according to the operation signal input through the input unit 14.

The client 3 includes a controller 31, a communication unit 32, a display unit 33, an input unit 34 and a storage unit 35. The controller 31 includes a CPU 41 and a memory 42. The CPU 41 serving as a processor executes processing according to a computer program stored in the storage unit 35.

The storage unit 35 stores a sub-management program 35*a*. The sub-management program 35*a* is a computer program for causing the CPU 41 to implement a function related to the management function of the master 2 to be implemented by the client 3. It may be understood that processing mainly executed by the controller 31 described below is implemented by the processing executed by the CPU 41 according to the computer program.

The communication unit 32 is connected to the local area network in the site where the client 3 is present, and is further connected to the wide area network. The communication unit 32 may be connected to the wide area network via a router (not shown). The display unit 33 includes, for example, a liquid crystal display, and is configured to display various screens for a user who operates the client 3. The input unit 34 includes one or more input devices for inputting an operation signal from a user who operates the client 3. The controller 31 operates according to the operation signal input through the input unit 34.

The first-type terminal device 4 includes a controller 51, a communication unit 52, a display unit 53 and an input unit 54. When the first-type terminal device 4 is a digital multifunction peripheral, the first-type terminal device 4 may further include a printing unit 55 and a reading unit 56. The first-type terminal device 4 may include only one of the printing unit 55 and the reading unit 56.

The controller 51 includes a CPU 61 and a memory 62. The memory 62 may include a nonvolatile memory such as a flash memory in addition to the RAM, and can store a computer program, setting data and the like in the nonvolatile memory.

The CPU 61 serving as a processor performs overall control of all the first-type terminal devices by executing processing according to the computer program stored in the memory 62. It may be understood that processing mainly executed by the controller 51 described below is implemented by the processing executed by the CPU 61 according to the computer program.

The communication unit 52 is connected to the local area network in the site where the first-type terminal device 4 is present so as to be able to communicate with the master 2 or the client 3 present in the local area network. The display unit 53 includes, for example, a liquid crystal display, and is configured to display various screens a user who operates the first-type terminal device 4. The input unit 54 includes, for example, one or more input devices such as a touch panel on a liquid crystal display in order to input an operation signal from the user.

The printing unit 55 is configured to print an image on a sheet under control of the controller 51. Examples of the printing unit 55 include an inkjet printer and a laser printer. According to the present embodiment, the status information such as a remaining amount of a color material and the log information such as the number of printed sheets are provided from the first-type terminal device 4 to the master 2 through the client 3 and the cloud server 6 by a method described later. The reading unit 56 is configured to read a reading target such as a printed matter under the control of the controller 51.

Figure 3:
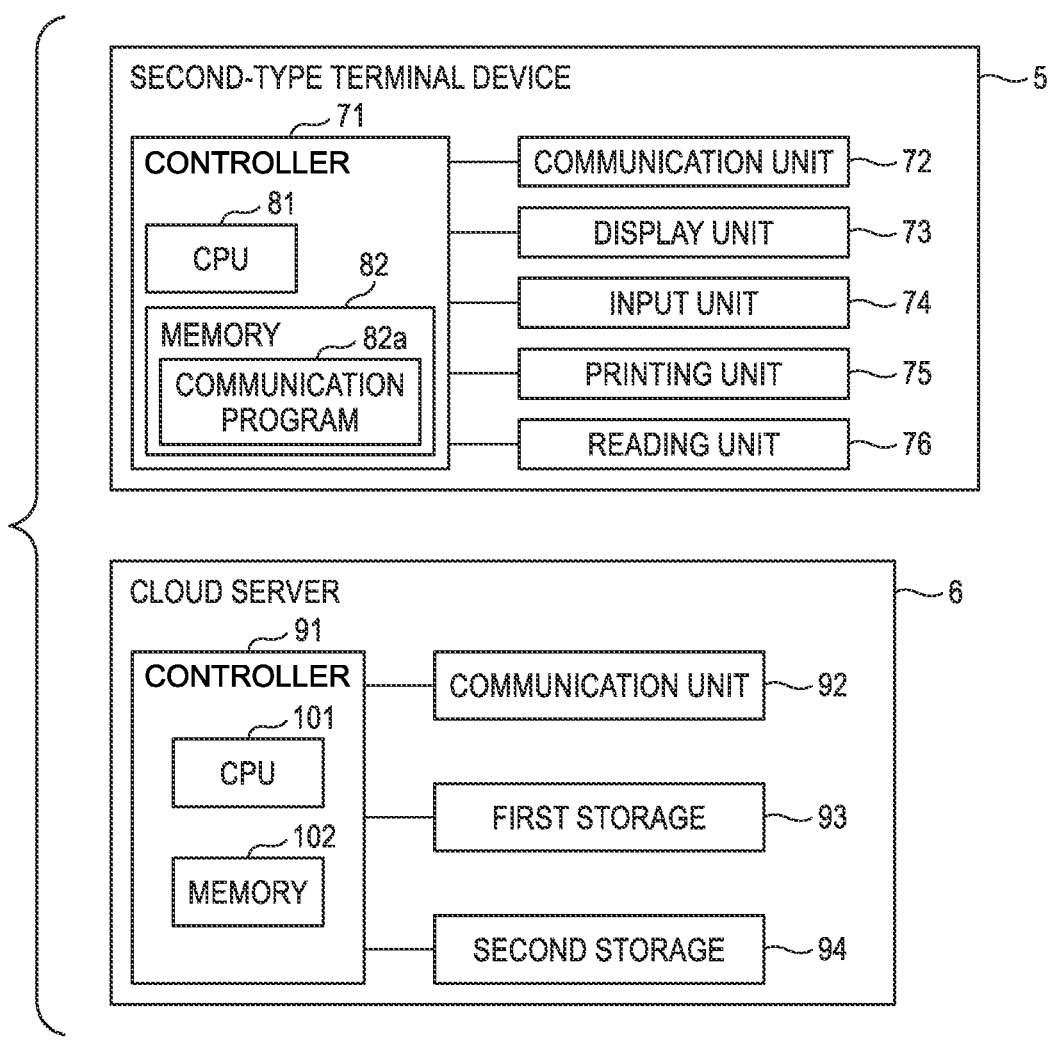
FIG. 3 is block diagrams showing configurations of a second-type terminal device and a client server.

As shown in FIG. 3, the second-type terminal device 5 includes a controller 71, a communication unit 72, a display unit 73 and an input unit 74. When the second-type terminal device 5 is a digital multifunction peripheral, the second-type terminal device 5 may further include a printing unit 75 and a reading unit 76. The second-type terminal device 5 may include only one of the printing unit 75 and the reading unit 76.

The controller 71 includes a CPU 81 and a memory 82. The memory 82 may include a nonvolatile memory such as a flash memory, and can store a computer program, setting data and the like in the nonvolatile memory.

The CPU 81 serving as a processor performs overall control of all the devices by executing processing according to a computer program stored in the memory 82. The memory 82 stores a communication program 82a. The communication program 82a is a program for using the cloud service provided by the cloud server 6. It may be understood that processing mainly executed by the controller 71 described below is implemented by the processing executed by the CPU 81 according to the computer program.

The communication unit 72 is connected to the wide area network so as to be able to communicate with the cloud server 6. When the local area network is constructed in the third site, the communication unit 72 may be connected to the wide area network via the local area network. The display unit 73 includes, for example, a liquid crystal display. The input unit 74 includes one or more input devices for inputting an operation signal from a user.

The printing unit 75 is configured to print an image on a sheet under control of the controller 71. According to the present embodiment, status information such as a remaining amount of a color material and log information such as the number of printed sheets are provided from the second-type terminal device 5 to the master 2 through the cloud server 6 by a method described later. The reading unit 76 is configured to read a reading target such as a printed matter under the control of the controller 71.

The cloud server 6 includes a controller 91, a communication unit 92, a first storage 93 and a second storage 94. The controller 91 includes a CPU 101 and a memory 102. The CPU 101 serving as a processor executes processing according to a computer program stored in the memory 102. The processing executed by the CPU 101 includes processing for causing the cloud server 6 to function as a cloud storage. It may be understood that processing mainly executed by the controller 91 described below is implemented by the processing executed by the CPU 101 according to the computer program.

The cloud storage includes a table storage and an object storage. By the controller 91 executing the above processing, the first storage 93 functions as the table storage, and the second storage 94 functions as the object storage.

The exemplary first storage 93 functions as a NoSQL data store, and is configured to be able to store a table having a group of schema-less entities as constituent elements. Each entity in the table includes a set of properties.

The exemplary second storage 94 functions as the object storage capable of reading and writing any text file and binary file as objects from outside using an HTTP/HTTPS protocol.

Azure of Microsoft Corporation is known as the cloud service providing the table storage and the object storage described above. The cloud server 6 can operate in the same manner as such a cloud service. Azure is a registered trademark.

(3) Scheduled Task

Figure 4:
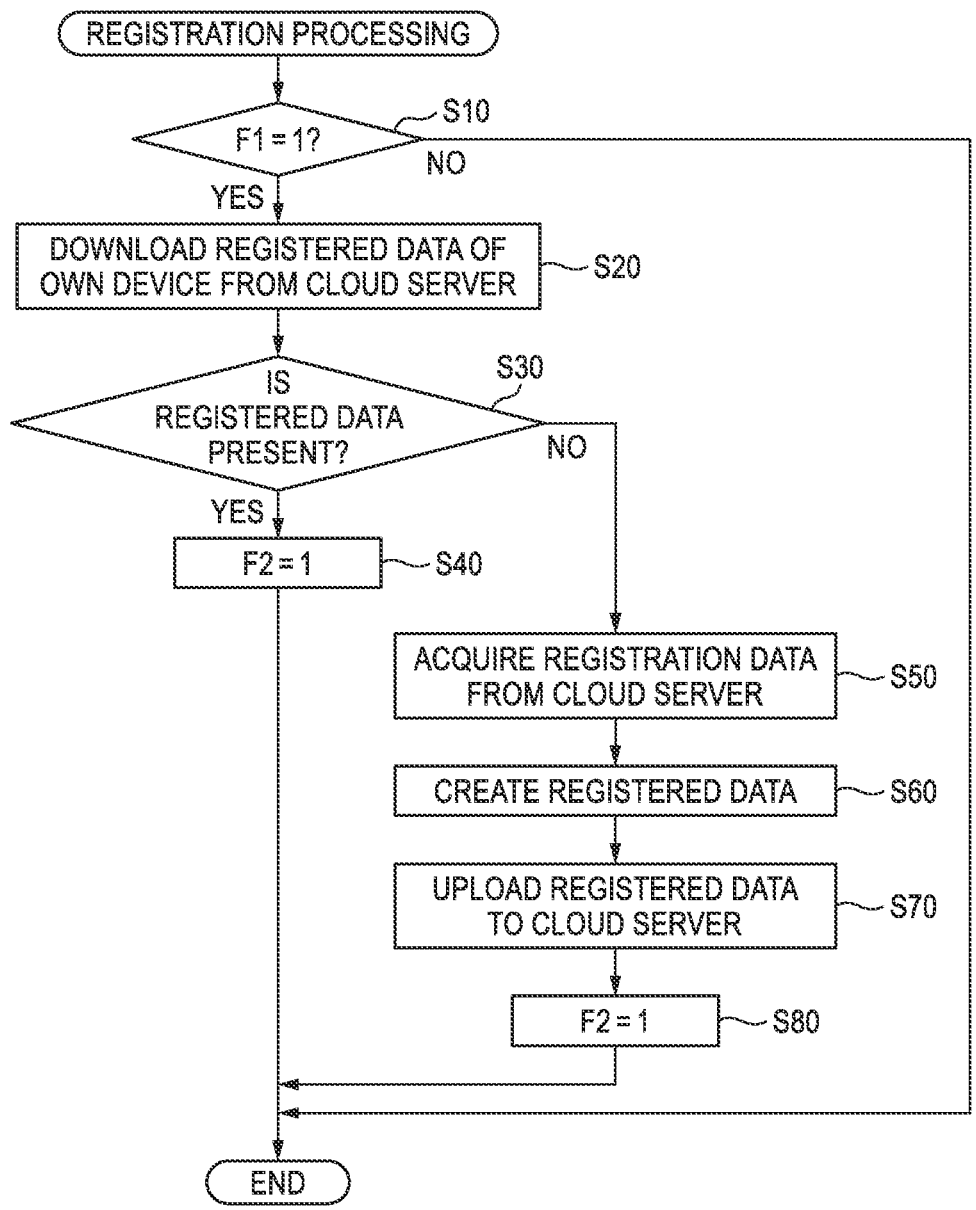
FIG. 4 is a flowchart showing registration processing.

Next, a procedure of registration processing executed by the controller 71 of the second-type terminal device 5 will be described. The registration processing is processing executed only once immediately after the second-type terminal device 5 is operated. When the registration processing is executed, the CPU 81 of the controller 71 first determines in S10 whether a validation flag F1 provided in the memory 82 is set as shown in FIG. 4. The validation flag F1 is set or cleared in connection setting processing described later. Setting a flag indicates that a value of the flag is set to 1, and clearing the flag indicates that the value of the flag is set to 0.

Here, when the validation flag F1 is cleared, the CPU 81 ends the registration processing. On the other hand, when the validation flag F1 is set, the CPU 81 downloads in S20 registered data described later of the second-type terminal device 5 (hereinafter referred to as an own device) from the first storage 93 of the cloud server 6.

Then, in S30, the CPU 81 determines whether the registered data of the own device is present in the first storage 93 of the cloud server 6. Here, when the registered data of the own device is present, the CPU 81 sets in S40 a registered flag F2 provided in the memory 82, and ends the registration processing.

On the other hand, when no registered data of own device is present, the CPU 81 downloads in S50 registration data described later from the first storage 93 of the cloud server 6.

Next, in S60, the CPU 81 creates registered data described later. Then, in S70, the CPU 81 uploads the registered data created in S60 to the first storage 93 of the cloud server 6.

Further, in S80, the CPU 81 sets the registered flag F2, and ends the registration processing. As shown in registration data D1 in FIG. 5, registration data is a template including a plurality of properties, and a character string is stored in each of the plurality of properties.

In the registration data D1 shown in FIG. 5, "Partition-Key", "RowKey", "DeviceId", "NotifyParameter", "Progress" and "Source" are set as properties.

The property "PartitionKey" stores a character string indicating a type of a task. In the registration data D1 shown in FIG. 5, the property "PartitionKey" stores "registration", which is a character string indicating that a scheduled task is a registration task for registering device information.

The property "RowKey" stores "% CUSTOM(DEVICEID) %" as a character string.

The property "DeviceId" stores "% CUSTOM(DEVICEID) %" as a character string.

The property "NotifyParameter" stores a character string described in the JSON format for indicating an instruction content of the registration task. In the property "NotifyParameter" of the registration data D1 shown in FIG. 5, a plurality of instructions different from each other are described for each line in second and subsequent lines.

The instruction in the second line is ""x.x.x.x. . . . ":"% MIB(x.x.x.x. . . . ) %"".

The "x.x.x.x. . . . " is an object ID of the MIB, and an actual object ID is displayed in a simplified manner. MIB is an abbreviation for Management Information Base. When the "x.x.x.x. . . . " is expressed as Oid1, the instruction in the second line is ""Oid1":"% MIB(Oid1) %"". "% MIB(Oid1)

%" is an instruction to acquire a value corresponding to Oid1 that is the object ID, and overwrite "% MIB(Oid1) %" with the acquired value. Therefore, when the value corresponding to Oid1 is "XXXXXXX", ""Oid1":"% MIB(Oid1) %"" is rewritten to ""Oid1":"XXXXXXX"" in the registered data.

Similarly, when the object ID "y.y.y.y. . . . " is expressed as Oid2, the instruction in the third line is ""Oid2":"% MIB(Oid2) %"".

In addition, when the object ID "z.z.z.z. . . . " is expressed as Oid3, the instruction in the fourth line is ""Oid3":"% MIB(Oid3) %"".

The property "Progress" stores "% CUSTOM(PROGRESS) %" as a character string. The property "Source" stores "% CUSTOM(SOURCE) %" as a character string.

As shown in registered data D2 in FIG. 5, the registered data has "PartitionKey", "RowKey", "DeviceId", "NotifyParameter", "Progress" and "Source" set as properties, similarly to the registration data.

The registered data is created by rewriting the character strings in the property "DeviceId", the property "NotifyParameter", the property "Progress" and the property "Source" in the registration data.

The property "DeviceId" stores a device ID of the own device. In the property "NotifyParameter", "% MIB(Oid) %" is replaced with a value corresponding to Oid. ""12345 . . . "" and ""0"" in the property "NotifyParameter" in the registered data D2 are replaced values.

The property "Progress" stores a character string "request". The property "Source" stores "device", which is a character string indicating the second-type terminal device 5.

Next, a procedure of regular status task execution processing executed by the controller 71 of the second-type terminal device 5 will be described. The regular status task execution processing is processing repeatedly executed during an operation of the second-type terminal device 5.

Figure 6:
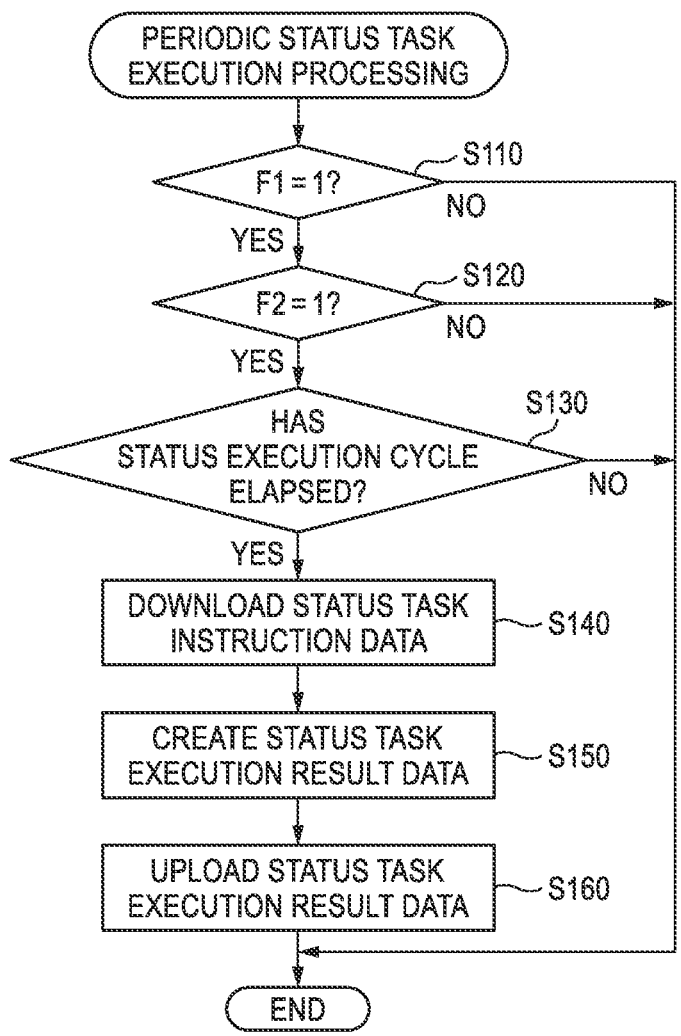
FIG. 6 is a flowchart showing regular status task execution processing.

When the regular status task execution processing is executed, the CPU 81 of the controller 71 first determines in S110 whether the validation flag F1 is set as shown in FIG. 6. Here, when the validation flag F1 is cleared, the CPU 81 ends the regular status task execution processing.

On the other hand, when the validation flag F1 is set, the CPU 81 determines in S120 whether the registered flag F2 is set. Here, when the registered flag F2 is cleared, the CPU 81 ends the regular status task execution processing. On the other hand, when the registered flag F2 is set, the CPU 81 determines in S130 whether a preset status execution cycle has elapsed.

Here, when the status execution cycle has not elapsed, the CPU 81 ends the regular status task execution processing. On the other hand, when the status execution cycle has elapsed, the CPU 81 downloads in S140 status task instruction data described later from the first storage 93 of the cloud server 6. The status task instruction data is uploaded to the first storage 93 of the cloud server 6 by the master 2.

Then, in S150, the CPU 81 executes a scheduled task designated by the status task instruction data, and creates status task execution result data indicating a result of executing the scheduled task.

Then, in S160, the CPU 81 uploads the status task execution result data created in S150 to the first storage 93 of the cloud server 6, and ends the regular status task execution processing.

As shown in status task instruction data D3 in FIG. 7, status task instruction data is a template including a plurality of properties, and a character string is stored in each of the plurality of properties.

In the status task instruction data D3 shown in FIG. 7, "PartitionKey", "RowKey", "DeviceId", "NotifyParameter", "Progress" and "Source" are set as properties.

The property "PartitionKey" stores a character string indicating a type of a task. In the status task instruction data D3 shown in FIG. 7, the property "PartitionKey" stores "status", which is a character string indicating that a scheduled task is a status task for notifying status information.

The property "RowKey" stores "% CUSTOM(DEVICEID) %" as a character string. The property "DeviceId" stores "% CUSTOM(DEVICEID) %" as a character string.

The property "NotifyParameter" stores a character string described in the JSON format for indicating an instruction content of a registration task. In the property "NotifyParameter" of the status task instruction data D3 shown in FIG. 7, a plurality of instructions different from each other are described for each line in second and subsequent lines.

The instruction in the second line is ""x.x.x.x. . . . ":"% MIB(x.x.x.x. . . . ) %"".

The "x.x.x.x. . . . " is an object ID of the MIB. The instruction in the third line is ""y.y.y.y. . . . ":"% MIB (y.y.y.y. . . . ) %"".

The "y.y.y.y. . . . " is an object ID of the MIB. The property "Progress" stores "% CUSTOM(PROGRESS) %" as a character string.

The property "Source" stores "% CUSTOM(SOURCE) %" as a character string. As shown in status task execution result data D4 in FIG. 7, the status task execution result data has "PartitionKey", "RowKey", "DeviceId", "NotifyParameter", "Progress" and "Source" set as properties, similarly to the status task instruction data.

The status task execution result data is created by rewriting the character strings in the property "DeviceId", the property "NotifyParameter", the property "Progress" and the property "Source" in the status task instruction data.

The property "DeviceId" stores a device ID of the own device. In the property "NotifyParameter", "% MIB(Oid) %" is replaced with a value corresponding to Oid. ""9876. . ."", ""40000"", and ""Sleep"" in the property "NotifyParameter" in the status task execution result data D4 are replaced values.

The property "Progress" stores a character string "% CUSTOM(done) %" indicating that a task is completed. The property "Source" stores "device", which is a character string indicating the second-type terminal device 5.

Next, a procedure of regular log task execution processing executed by the controller 71 of the second-type terminal device 5 will be described. The regular log task execution processing is processing repeatedly executed during the operation of the second-type terminal device 5.

Figure 8:
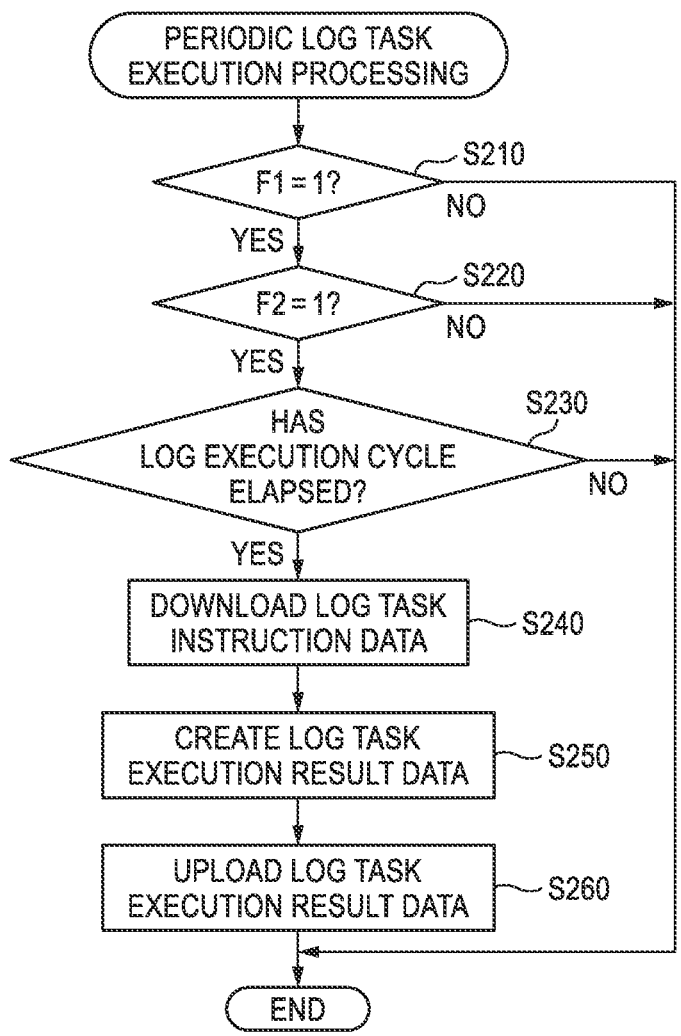
FIG. 8 is a flowchart showing regular log task execution processing.

When the regular log task execution processing is executed, the CPU 81 of the controller 71 first determines in S210 whether the validation flag F1 is set as shown in FIG. 8. Here, when the validation flag F1 is cleared, the CPU 81 ends the regular log task execution processing.

On the other hand, when the validation flag F1 is set, the CPU 81 determines in S220 whether the registered flag F2 is set. Here, when the registered flag F2 is cleared, the CPU 81 ends the regular log task execution processing. On the other hand, when the registered flag F2 is set, the CPU 81 determines in S230 whether a preset log execution cycle has elapsed.

Here, when the log execution cycle has not elapsed, the CPU 81 ends the regular log task execution processing. On the other hand, when the log execution cycle has elapsed, the CPU 81 downloads in S240 log task instruction data described later from the first storage 93 of the cloud server 6. The log task instruction data is uploaded to the first storage 93 of the cloud server 6 by the master 2.

Then, in S250, the CPU 81 executes a scheduled task designated by the log task instruction data, and creates log task execution result data indicating a result of executing a log task.

Then, in S260, the CPU 81 uploads the log task execution result data created in S250 to the first storage 93 of the cloud server 6, and ends the regular log task execution processing.

The log task instruction data and the log task execution result data are the same as the status task instruction data and the status task execution result data, respectively, except that "log" is stored in the property "PartitionKey" instead of "status". Therefore, description thereof is omitted.

The controller 31 of the client 3 executes the regular status task execution processing and the regular log task execution processing in the same manner as the controller 71 of the second-type terminal device 5. However, an instruction format of instruction contents stored in the property "NotifyParameter" of the status task instruction data and the log task instruction data is different from that of the second-type terminal device 5.

(4) Instant Task

Next, a procedure of instant task execution processing executed by the controller 71 of the second-type terminal device 5 will be described. The instant task execution processing is processing repeatedly executed during the operation of the second-type terminal device 5.

Figure 9A:
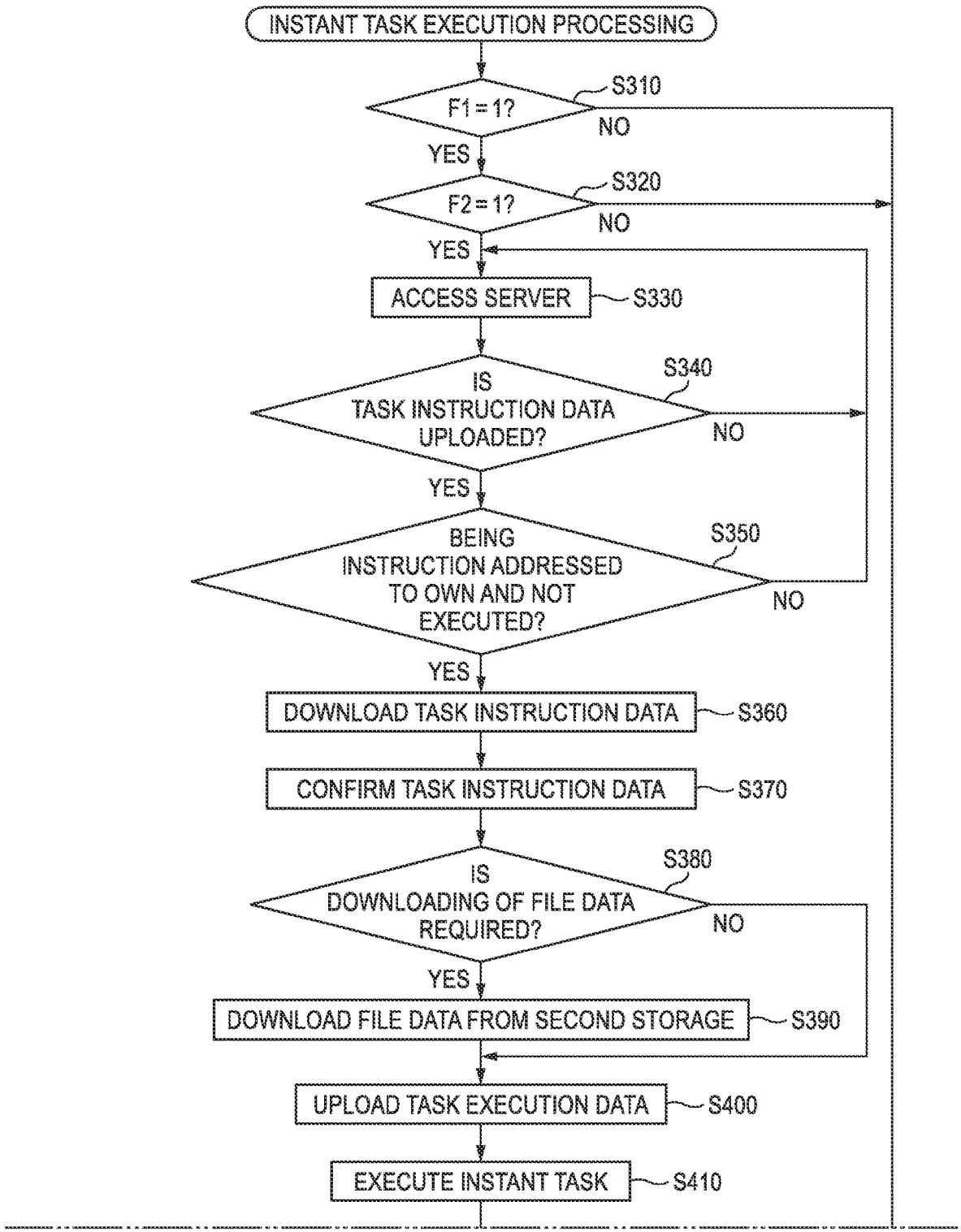
FIGS. 9A and 9B shows a flowchart of instant task execution processing.
Figure 9B:
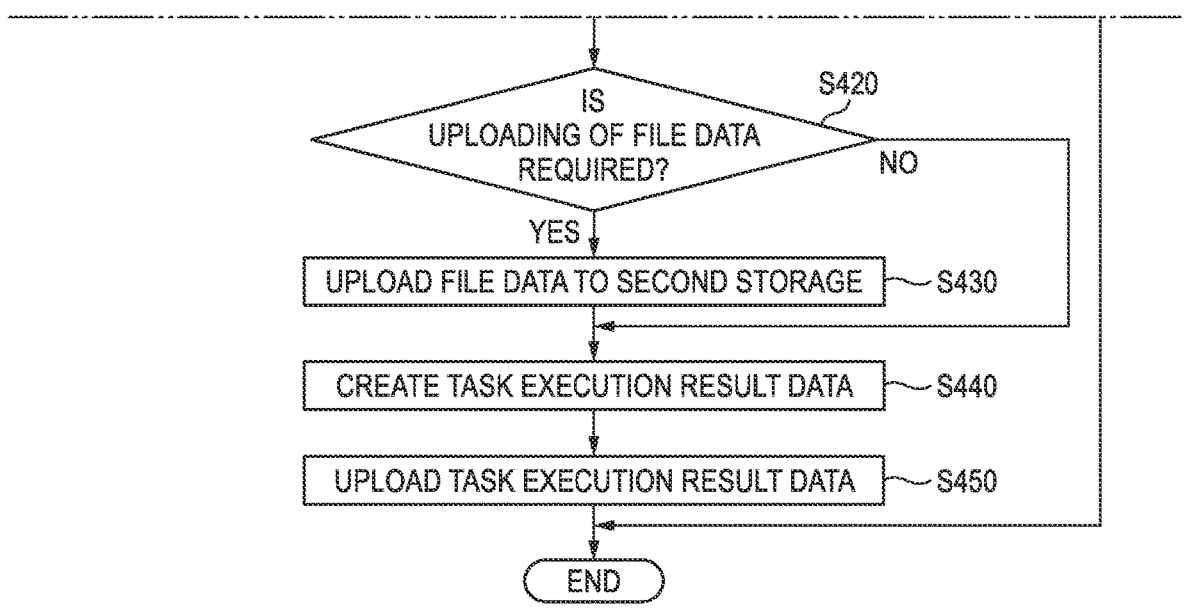

When the instant task execution processing is executed, the CPU 81 of the controller 71 first determines in S310 whether the validation flag F1 is set as shown in FIGS. 9A and 9B. Here, when the validation flag F1 is cleared, the CPU 81 ends the instant task execution processing.

On the other hand, when the validation flag F1 is set, the CPU 81 determines in S320 whether the registered flag F2 is set. Here, when the registered flag F2 is cleared, the CPU 81 ends the instant task execution processing. On the other hand, when the registered flag F2 is set, the CPU 81 accesses the cloud server 6 in S330. Then, in S340, the CPU 81 determines whether instant task instruction data is uploaded to the first storage 93. The instant task instruction data is uploaded to the first storage 93 of the cloud server 6 by the master 2.

Here, when the instant task instruction data is not uploaded, the CPU 81 proceeds to S330. On the other hand, when the instant task instruction data is uploaded, the CPU 81 determines in S350 whether the uploaded instant task instruction data is an instruction addressed to the second-type terminal device 5 and an instruction not executed by the second-type terminal device 5.

Here, when the uploaded instant task instruction data is not an instruction addressed to the second-type terminal device 5 but an instruction executed by the second-type terminal device 5, the CPU 81 proceeds to S330.

On the other hand, when the uploaded instant task instruction data is an instruction addressed to the second-type terminal device 5 and an instruction not executed by the second-type terminal device 5, the CPU 81 downloads in S360 the task instruction data uploaded to the first storage 93.

Further, in S370, the CPU 81 confirms a content of the downloaded instant task instruction data. Then, in S380, the CPU 81 determines whether the downloaded task instruction data is an instruction that requires downloading of file data based on a confirmation result in S370.

Here, when the instruction does not require the file data, the CPU 81 proceeds to S400. On the other hand, when the instruction requires the file data, the CPU 81 downloads in S390 the file data from the second storage 94 of the cloud server 6 based on the confirmation result in S370, and proceeds to S400.

After proceeding to S400, the CPU 81 uploads instant task execution data described later indicating that the instant task is being executed to the first storage 93 of the cloud server 6. The CPU 81 uploads the instant task execution data by overwriting the instant task instruction data stored in the first storage 93 with the instant task execution data.

Further, in S410, the CPU 81 executes the instant task specified by the downloaded instant task instruction data. Then, in S420, the CPU 81 determines whether the executed instant task is a task that requires uploading of file data.

Here, when the task does not require uploading of the file data, the CPU 81 proceeds to S440. On the other hand, when the task requires uploading of the file data, the CPU 81 uploads in S430 the file data created by executing the instant task to the second storage 94 of the cloud server 6, and proceeds to S440.

After proceeding to S440, the CPU 81 creates instant task execution result data described later indicating a result of executing the instant task by the second-type terminal device 5. Further, in S450, the CPU 81 uploads the created instant task execution result data to the first storage 93 of the cloud server 6, and ends the instant task execution processing. The CPU 81 uploads the instant task execution result data by overwriting the instant task execution data stored in the first storage 93 with the instant task execution result data.

As shown in instant task instruction data D11 in FIG. 10, instant task instruction data is a template including a plurality of properties, and a character string is stored in each of the plurality of properties.

In the instant task instruction data D11 shown in FIG. 10, "PartitionKey", "RowKey", "DeviceId", "NotifyParameter", "Progress" and "Source" are set as properties.

The property "PartitionKey" stores a character string indicating a type of a task. In the instant task instruction data D11 shown in FIG. 10, the property "PartitionKey" stores "instanttask", which is a character string indicating an instant task.

The property "RowKey" stores a transaction ID for identifying each instant task instruction data. The property "DeviceId" stores a device ID for identifying the first-type terminal device 4 or the second-type terminal device 5 that is a destination of an instruction.

The property "NotifyParameter" stores a character string described in the JSON format for indicating an instruction content of the instant task. The property "Progress" stores a character string indicating a progress status of the instruction. In the instant task instruction data D11 shown in FIG. 10, the property "Progress" stores "% CUSTOM(request) %" indicating that execution of the instruction is requested.

The property "Source" is not used and is blank. As shown by task execution data D12 in FIG. 10, the task execution data is created by replacing "% CUSTOM(request) %" in the property "Progress" of the instant task instruction data with "% CUSTOM(processing) %". "% CUSTOM(processing) %" is a character string indicating that the task is being executed.

As shown in instant task execution result data D13 in FIG. 10, the instant task execution result data is created by replacing "% CUSTOM(request) %" in the property "Progress" of the instant task instruction data with "% CUSTOM(done) %" or "% CUSTOM(error) %". "% CUSTOM(done) %" is a character string indicating that execution of the task is completed. "% CUSTOM(error) %" is a character string indicating that an error has occurred due to the execution of the task.

The controller 31 of the client 3 executes the instant task execution processing in the same manner as the controller 71 of the second-type terminal device 5. However, an instruction format of instruction contents stored in the property "NotifyParameter" of the instant task instruction data is different from that of the second-type terminal device 5. The instant task execution processing executed by the controller 31 of the client 3 is different from the instant task execution processing executed by the controller 71 of the second-type terminal device 5 in that the first-type terminal device 4 connected to the client 3 is caused to execute the instant task.

(5) Connection Setting

Next, a procedure of connection setting processing executed by the controller 71 of the second-type terminal device 5 will be described. The connection setting processing is processing repeatedly executed during the operation of the second-type terminal device 5.

Figure 11:
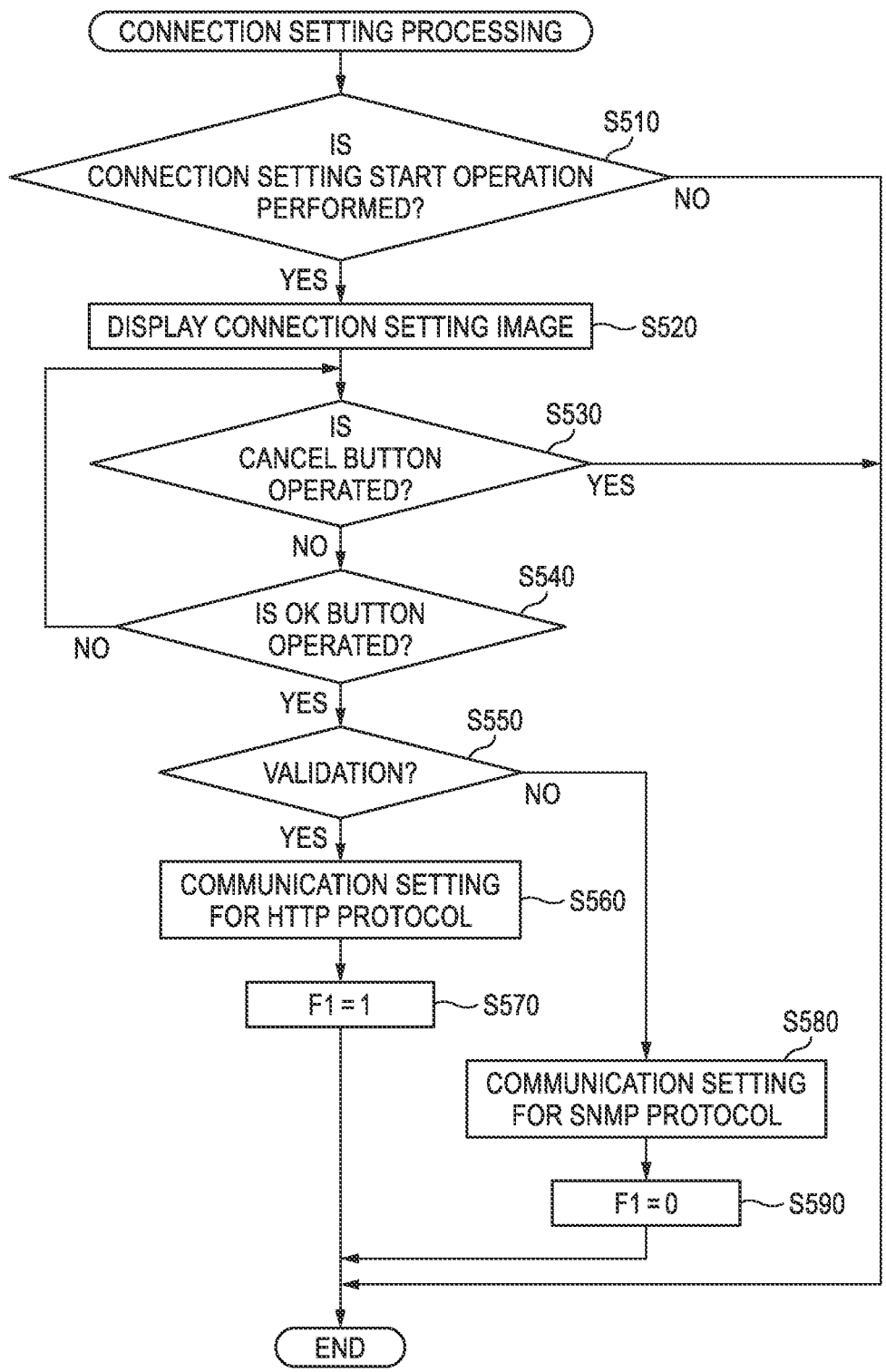
FIG. 11 is a flowchart showing connection setting processing.

When the connection setting processing is executed, the CPU 81 of the controller 71 first determines in S510 whether a connection setting start operation is performed on the second-type terminal device 5 as shown in FIG. 11. Specifically, the CPU 81 determines whether an operation signal indicating the connection setting start operation is input from an input unit 64. When the operation signal indicating the connection setting start operation is input, the CPU 81 determines that the connection setting start operation is performed.

Here, when the connection setting start operation is not performed, the CPU 81 ends the connection setting processing. On the other hand, when the connection setting start operation is performed, the CPU 81 displays a connection setting image on a display screen of the display unit 73 in S520.

Figure 12:
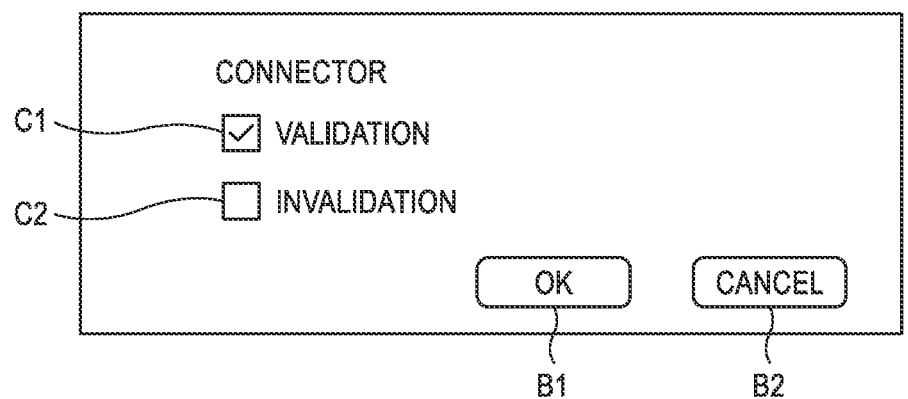
FIG. 12 is a view showing a connection setting image.

As shown in FIG. 12, the connection setting image includes a validation check box C1, an invalidation check box C2, an OK button B1 and a cancel button B2. One of the validation check box C1 and the invalidation check box C2 is selectively selected.

The validation check box C1 is selected to enable communication between the second-type terminal device 5 and the cloud server 6. The invalidation check box C2 is selected to prevent communication between the second-type terminal device 5 and the cloud server 6.

Next, as shown in FIG. 11, in S530, the CPU 81 determines whether the cancel button B2 is operated. Here, when the cancel button B2 is operated, the CPU 81 ends the connection setting processing. On the other hand, when the cancel button B2 is not operated, the CPU 81 determines in S540 whether the OK button B1 is operated.

Here, when the OK button B1 is not operated, the CPU 81 proceeds to S530. On the other hand, when the OK button B1 is operated, the CPU 81 determines in S550 whether the validation check box C1 is selected. Here, when the validation check box C1 is selected, in S560, the CPU 81 performs communication setting for performing communication using the HTTP protocol on the communication unit 72 of the second-type terminal device 5. Then, in S570, the CPU 81 sets the validation flag F1, and ends the connection setting processing.

On the other hand, when the validation check box C1 is not selected, in S580, the CPU 81 performs communication setting for performing communication using an SNMP protocol on the communication unit 72 of the second-type terminal device 5. Then, in S590, the CPU 81 clears the validation flag F1, and ends the connection setting processing.

Next, a procedure of SNMP communication processing executed by the controller 71 of the second-type terminal device 5 will be described. The SNMP communication processing is processing repeatedly executed during the operation of the second-type terminal device 5.

Figure 13:
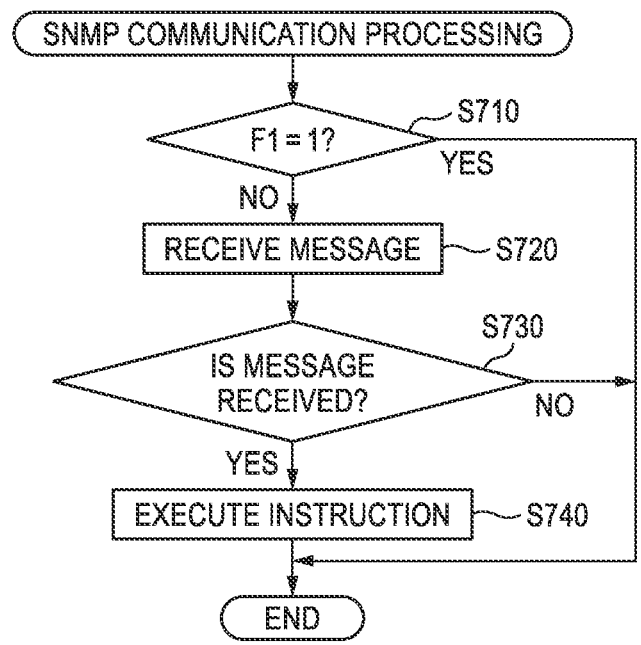
FIG. 13 is a flowchart showing SNMP communication processing.

When the SNMP communication processing is executed, the CPU 81 of the controller 71 first determines in S710 whether the validation flag F1 is set as shown in FIG. 13. Here, when the validation flag F1 is set, the CPU 81 ends the SNMP communication processing.

On the other hand, when the validation flag F1 is cleared, the CPU 81 receives in S720 a message by performing communication using the SNMP protocol. Then, in S730, the CPU 81 determines whether the message is received in S720.

When the message is not received, the CPU 81 ends the SNMP communication processing. On the other hand, when the message is received, in S740, the CPU 81 executes an instruction requested by the message received in S720, and ends the SNMP communication processing.

(6) Effects

The second-type terminal device 5 configured as described above is an information processing device of the management system 1 in which the master 2 and the second-type terminal device 5 are configured to be able to communicate with the cloud server 6, and includes the controller 71. The controller 71 is configured to execute download processing, creation processing and upload processing.

In the download processing, the registration data, the status task instruction data and the log task instruction data including a plurality of pieces of regular processing instruction information for respectively instructing a plurality of scheduled tasks to be executed by the second-type terminal device 5 are downloaded from the cloud server 6. Hereinafter, the registration data, the status task instruction data and the log task instruction data are collectively referred to as scheduled task instruction data.

The plurality of pieces of regular processing instruction information in the registration data are, for example, "% MIB(x.x.x.x. . . . ) %" and "% MIB(y.y.y.y. . . . ) %" shown in FIG. 5.

The plurality of pieces of regular processing instruction information in the status task instruction data are, for example, "% MIB(x.x.x.x. . . . ) %" and "% MIB (y.y.y.y. . . . ) %" shown in FIG. 7.

The creation processing creates the registered data, the status task execution result data and the log task execution result data in which the plurality of pieces of regular processing instruction information in the scheduled task instruction data are respectively replaced with a plurality of pieces of processing notification information to be notified to the master 2 corresponding to the plurality of pieces of regular processing instruction information. Hereinafter, the registered data, the status task execution result data and the log task execution result data are collectively referred to as scheduled task execution result data.

The plurality of pieces of processing notification information in the registered data are, for example, "12345 . . . " and "0" shown in FIG. 5. The plurality of pieces of processing notification information in the status task execution result data are, for example, "9876 . . . " and "40000" shown in FIG. 7.

In the upload processing, the scheduled task execution result data created by the creation processing is uploaded to the cloud server 6. Thereby, the second-type terminal device 5 can cause the master 2 to collectively acquire the plurality of pieces of processing notification information by causing the master 2 to download the scheduled task execution result data, and thus an efficiency of data acquisition by the master 2 can be improved.

The master 2 uploads the instant task instruction data including anytime processing instruction information for instructing the instant task to the cloud server 6 at any time. The anytime processing instruction information is a character string stored in the property "NotifyParameter" of the instant task instruction data D11 shown in FIG. 10.

The controller 71 of the second-type terminal device 5 is configured to further execute anytime download processing, anytime creation processing and anytime upload processing. In the anytime download processing, the instant task instruction data is downloaded from the cloud server 6.

In the anytime creation processing, the instant task execution result data is created by adding, to the instant task instruction data, anytime notification information to be notified to the master 2 regarding the instant task indicated by the anytime processing instruction information included in the instant task instruction data. The anytime notification information is "% CUSTOM(done) %" and "% CUSTOM (error) %" stored in the property "Progress" of the instant task execution result data D13 shown in FIG. 10.

In the anytime upload processing, the instant task execution result data created by the anytime creation processing is uploaded to the cloud server 6. Thereby, the second-type terminal device 5 can execute a task using a template in both the scheduled task and the instant task.

The scheduled task instruction data is intended for all the terminal devices 4, 5 managed by the master 2. In addition, the instant task instruction data is intended for specific terminal devices 4, 5 that execute the instant task.

In the upload processing, the scheduled task execution result data is uploaded to the cloud server 6 without overwriting the scheduled task instruction data stored in the cloud server 6 with the scheduled task execution result data.

In the anytime upload processing, the instant task execution result data is uploaded to the cloud server 6 by overwriting the instant task instruction data stored in the cloud server 6 with the instant task execution result data.

The controller 71 of the second-type terminal device 5 is configured to execute setting processing of setting whether to validate or invalidate a function of the communication unit 72 configured to perform data communication with the cloud server 6, based on input operation information output from the input unit 74.

Thereby, the second-type terminal device 5 can be switched to a device capable of communicating with the cloud server 6 or a device incapable of communicating with the cloud server 6 by an operation of the user.

The controller 71 of the second-type terminal device 5 is configured to execute prohibition processing and acquisition processing. In the prohibition processing, execution of the download processing, the creation processing and the upload processing are prohibited when the function of the communication unit 72 is invalidated. In the acquisition processing, a plurality of pieces of processing instruction information are acquired from the client 3 by the SNMP protocol when the function of the communication unit 72 is invalidated.

For instance, the master 2 may be a management device, the second-type terminal device 5 may be an information processing device, the cloud server 6 may be a storage device, and the communication program 82a may be a management program.

S50, S140 and S240 correspond to the download processing and download steps, S60, S150 and S250 correspond to the creation processing and creation steps, and S70, S160 and S260 correspond to the upload processing and upload steps.

The registration data, the status task instruction data and the log task instruction data correspond to an instruction template and a regular instruction template, and the scheduled task corresponds to regular processing.

"% MIB(x.x.x.x. . . . ) %", "% MIB(y.y.y.y. . . . ) %" and the like correspond to the processing instruction information and the regular processing instruction information.

The registered data, the status task execution result data and the log task execution result data correspond to an update template and a regular update template. "12345 . . . " and "9876 . . . " correspond to the processing notification information.

S360 corresponds to the anytime download processing, S440 corresponds to the anytime creation processing, and S450 corresponds to the anytime upload processing. The instant task corresponds to anytime processing, the instant task instruction data corresponds to an anytime instruction template, and the instant task execution result data corresponds to an anytime update template.

S510 to S590 correspond to the setting processing, S10, S110 and S210 correspond to the prohibition processing, S710 and S720 correspond to the acquisition processing, and the client 3 corresponds to a sub-management device. Although an embodiment of the present disclosure has been described above, the present disclosure is not limited to the above-described embodiment and can be implemented in various modifications.

For example, in the above-described embodiment, the connection setting image is displayed on the display unit 83 by using the connection setting processing to set validation or invalidation of communication between the second-type terminal device 5 and the cloud server 6, but the setting may be performed by an EWS. The EWS is an abbreviation for Embedded Web Server.

A plurality of functions of one constituent element in the above-described embodiment may be implemented by a plurality of constituent elements, or one function of one constituent element may be implemented by a plurality of constituent elements. A plurality of functions of a plurality of constituent elements may be implemented by one constituent element, or one function to be implemented by a plurality of constituent elements may be implemented by one constituent element. A part of a configuration in the above-described embodiment may be omitted. At least a part of the configuration in the above-described embodiment may be added to or replaced with a configuration in another embodiment.

In addition to the second-type terminal device 5 described above, the present disclosure may be implemented in various forms such as a system including the second-type terminal device 5 as a constituent element, a program for causing a computer to function as the second-type terminal device 5, a non-transitory tangible recording medium such as a semiconductor memory in which the program is recorded, and a management method.

REFERENCE SIGNS LIST

What is claimed is:

1. An information processing device for a management system in which a management device and the information processing device are configured to communicate with a storage device, the information processing device comprising a controller that is configured to:
   download, from the storage device, an instruction template including a plurality of pieces of processing instruction information for instructing a plurality of pieces of processing to be executed by the information processing device;
   create an update template in which each of the plurality of pieces of processing instruction information in the instruction template is replaced with a corresponding piece of a plurality of pieces of processing notification information to be notified to the management device; and
   upload the update template to the storage device,
   wherein processing to be regularly executed by the information processing device is defined as regular processing and the management device regularly uploads a regular instruction template to the storage device, the regular instruction template being the instruction template including a plurality of pieces of regular processing instruction information that is the processing instruction information for a plurality of pieces of the regular processing,
   wherein processing to be executed as needed is defined as as-needed processing and the management device uploads an as-needed instruction template to the storage device as needed, the as-needed instruction template being the instruction template including as-needed processing instruction information that is the processing instruction information for instructing the as-needed processing,
   wherein, in the downloading, the regular instruction template is downloaded as the instruction template,
   wherein, in the creating, the update template in which the regular processing instruction information is replaced with the processing notification information in the regular instruction template is created as a regular update template,
   wherein, in the uploading, the created regular update template is uploaded to the storage device, and
   wherein the controller is further configured to:
      download the as-needed instruction template from the storage device as needed:
      creating an as-needed update template in which as-needed notification information to be notified to the management device regarding the as-needed processing indicated by the as-needed processing instruction information included in the as-needed instruction template is added to the as-needed instruction template; and
      uploading the as-needed update template created as needed to the storage device.

2. The information processing device according to claim 1,
   wherein the regular instruction template is intended for all information processing devices managed by the management device, and
   wherein the as-needed instruction template is intended for a specific information processing device that executes the as-needed processing.

3. The information processing device according to claim 1,
   wherein, in the uploading, the regular update template is uploaded to the storage device without overwriting the regular instruction template stored in the storage device with the regular update template, and
   wherein, in the as-needed uploading, the as-needed update template is uploaded to the storage device by overwriting the as-needed instruction template stored in the storage device with the as-needed update template.

4. The information processing device according to claim 1 further comprising:
   a communication unit that is configured to perform data communication with the storage device; and
   an input unit that is configured to output input operation information for specifying an input operation performed by a user,
   wherein the controller is configured to validate or invalidate a function of the communication unit based on the input operation information output from the input unit.

5. The information processing device according to claim 4,
   wherein the controller is configured to:
      prohibiting the downloading, the creating and the uploading when the communication unit is invalidated, and
      acquiring a plurality of pieces of the processing instruction information by using an SNMP protocol from a sub-management device which is communicably connected to the storage device and the information processing device, when the communication unit is invalidated.

6. A non-transitory computer readable medium storing a management program causing a controller to execute a process for controlling an information processing device the controller being included in the information processing device for a management system in which a management device and the information processing device are configured to communicating with a storage device,
   wherein the process includes:
      downloading, from the storage device, an instruction template including a plurality of pieces of processing instruction information for instructing a plurality of pieces of processing to be executed by the information processing device;
      creating an update template in which each of the plurality of pieces of processing instruction information in the instruction template is replaced with a corresponding piece of a plurality of pieces of processing notification information to be notified to the management device; and
      uploading the update template to the storage device,
   wherein processing to be regularly executed by the information processing device is defined as regular processing and the management device regularly uploads a regular instruction template to the storage device, the regular instruction template being the instruction template including a plurality of pieces of regular processing instruction information that is the processing instruction information for a plurality of pieces of the regular processing,
   wherein processing to be executed as needed is defined as as-needed processing and the management device uploads an as-needed instruction template to the storage device as needed, the as-needed instruction template being the instruction template including as-needed processing instruction information that is the processing instruction information for instructing the as-needed processing, wherein, in the downloading, the regular instruction template is downloaded as the instruction template, wherein, in the creating, the update template in which the regular processing instruction information is replaced with the processing notification information in the regular instruction template is created as a regular update template, wherein, in the uploading, the created regular update template is uploaded to the storage device, and wherein the controller is further configured to:
- download the as-needed instruction template from the storage device as needed:
- creating an as-needed update template in which as-needed notification information to be notified to the management device regarding the as-needed processing indicated by the as-needed processing instruction information included in the as-needed instruction template is added to the as-needed instruction template; and
- uploading the as-needed update template created as needed to the storage device.

7. A management method executed by an information processing device for a management system in which a management device and the information processing device are configured to communicate with a storage device, the information processing device including a controller, and the management method comprising:
- downloading, from the storage device, an instruction template including a plurality of pieces of processing instruction information for instructing a plurality of pieces of processing to be executed by the information processing device;
- creating an update template in which each of the plurality of pieces of processing instruction information in the instruction template is replaced with a corresponding piece of a plurality of pieces of processing notification information to be notified to the management device; and
- uploading the update template to the storage device, wherein processing to be regularly executed by the information processing device is defined as regular processing and the management device regularly uploads a regular instruction template to the storage device, the regular instruction template being the instruction template including a plurality of pieces of regular processing instruction information that is the processing instruction information for a plurality of pieces of the regular processing, wherein processing to be executed as needed is defined as as-needed processing and the management device uploads an as-needed instruction template to the storage device as needed, the as-needed instruction template being the instruction template including as-needed processing instruction information that is the processing instruction information for instructing the as-needed processing, wherein, in the downloading, the regular instruction template is downloaded as the instruction template, wherein, in the creating, the update template in which the regular processing instruction information is replaced with the processing notification information in the regular instruction template is created as a regular update template, wherein, in the uploading, the created regular update template is uploaded to the storage device, and wherein the controller is further configured to:
- download the as-needed instruction template from the storage device as needed:
- creating an as-needed update template in which as-needed notification information to be notified to the management device regarding the as-needed processing indicated by the as-needed processing instruction information included in the as-needed instruction template is added to the as-needed instruction template; and
- uploading the as-needed update template created as needed to the storage device.

8. An information processing device for a management system in which a management device and the information processing device are configured to communicate with a storage device, the information processing device comprising a controller that is configured to:
- download, from the storage device, an instruction template including a plurality of pieces of processing instruction information for instructing a plurality of pieces of processing to be executed by the information processing device;
- create an update template in which each of the plurality of pieces of processing instruction information in the instruction template is replaced with a corresponding piece of a plurality of pieces of processing notification information to be notified to the management device; and
- upload the update template to the storage device, and wherein the information processing device further includes:
- a communication unit that is configured to perform data communication with the storage device; and
- an input unit that is configured to output input operation information for specifying an input operation performed by a user, wherein the controller is configured to validate or invalidate a function of the communication unit based on the input operation information output from the input unit.

9. A non-transitory computer readable medium storing a management program causing a controller to execute a process for controlling an information processing device the controller being included in the information processing device for a management system in which a management device and the information processing device are configured to communicating with a storage device, wherein the process includes:
- downloading, from the storage device, an instruction template including a plurality of pieces of processing instruction information for instructing a plurality of pieces of processing to be executed by the information processing device;
- creating an update template in which each of the plurality of pieces of processing instruction information in the instruction template is replaced with a corresponding piece of a plurality of pieces of processing notification information to be notified to the management device; and
- uploading the update template to the storage device;

wherein the information processing device includes:
- a communication unit that is configured to perform data communication with the storage device; and
- an input unit that is configured to output input operation information for specifying an input operation performed by a user, wherein the controller is configured to validate or invalidate a function of the communication unit based on the input operation information output from the input unit.

\* \* \* \* \*